Patented Oct. 17, 1933

1,931,395

UNITED STATES PATENT OFFICE 1,931,395

SUBSTITUTED GUANIDINE SALTS OF FATTY ACIDS, AND PROCESS OF PRODUCING SAME

Winfield Scott, Nitro, W. Va., assignor to The Rubber Service Laboratories Company, Akron, Ohio, a corporation of Ohio No Drawing. Original application October 6, 1925, Serial No. 60,732. Divided and this application December 10, 1927. Serial No. 239,265

4 Claims. (Cl. 260—112)

This invention relates to organic soaps and the process for the manufacture of the same.

I have found that those members of the fatty acid series containing from 14 to 20 carbon atoms which are but weakly acidic in nature, such as myristic, palmitic, stearic, arachidic acids and the like and those acids derived from the unsaturated hydrocarbons such as oleic, linoleic, ricinoleic acids and the like may be readily combined with the organic bases particularly the aryl substituted guanidines to produce salts, or, as I prefer to term them organic soaps.

Such compounds may be prepared most simply by mixing together the acid and the base in approximately equi-molecular proportions and preferably employing not over 6% excess by weight of the fatty acid taken while heating to a temperature, preferably slightly above the melting point of the acid used. Thus, for example, approximately 300 parts of stearic acid are heated to a temperature of about 80° C., and 240 parts of di-o-tolyl-guanidine are added slowly thereto, with stirring. The heat evolved during the reaction is sufficient to maintain the temperature mentioned during this stage of the process. After all the guanidine has been added, the temperature is increased to approximately 100° C. and maintained thereat, preferably while stirring, for a period of time sufficient to insure the completion of the reaction. The stearate of di-o-tolyl-guanidine so obtained is a thick, syrup-like compound when first prepared. On standing for a few hours, it solidifies to a stiff cake resembling stearic acid in consistency but of a darker color and possessing a lower softening point. The product may, if desired, be filtered while molten, directly into the shipping drum or container, thereby avoiding contamination with any impurities which might be accidentally incorporated during the step. Other organic acid compounds of the tolyl guanidines, and of other similar compounds, may be prepared in a similar manner.

The temperatures mentioned above are by no means critical and may vary, for example, between the melting point of the organic acid and the decomposition temperature of the substances employed. Thus, since diphenylguanidine decomposes at temperatures but slightly above its melting point, it would be necessary to maintain temperatures below 147° C. and preferably at about 140° C., when using this substance for the preparation of the compounds described.

The reaction taking place most probably between di-o-tolyl guanidine and stearic acid is that represented by the following equation:

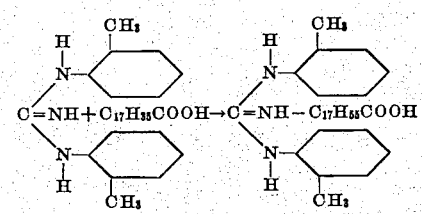

Other methods of preparing the organic soaps of the type mentioned, may of course be used. For example, a metallic stearate may be reacted with a salt of an organic base. Thus, sodium stearate may be reacted with diphenylguanidine-hydrochloride, preferably dissolved in a suitable solvent such as water, whereby the organic soap is produced.

The example set forth is to be understood as illustrative only and not at all limitative of the invention. The invention is limited solely by the claims attached hereto as a part of this specification wherein it is intended to clam the invention as broadly as possible.

This case is a division of application Serial No. 60,732, filed October 6, 1925, which on February 18, 1930 matured into Patent No. 1,747,187.

What is claimed is:

1. The process for the manufacture of organic salts which comprises reacting a fatty acid containing from 14 to 20 carbon atoms and a di-substituted guanidine in approximately equal molecular proportions wherein said substituents are aryl groups consisting of a single benzene nucleus.

2. The process for the manufacture of organic salts which comprises mixing stearic acid and di-o-tolyl-guanidine in approximately molecular proportions while heating to a temperature slightly above the melting point of the acid.

3. An organic salt possessing the structural formula of

wherein R is an aryl group possessing a single benzene nucleus and X is a fatty acid containing from 14 to 20 carbon atoms.

4. An organic salt possessing the structural formula of

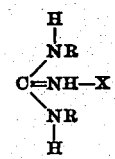

where R is one member of a group consisting of phenyl and tolyl radicals and X is a fatty acid containing from 14 to 20 carbon atoms.

WINFIELD SCOTT.